April 26, 1966 C. T. CANNON 3,248,074
AIRBORNE CARRIER SYSTEM
Filed April 28, 1964 2 Sheets-Sheet 1
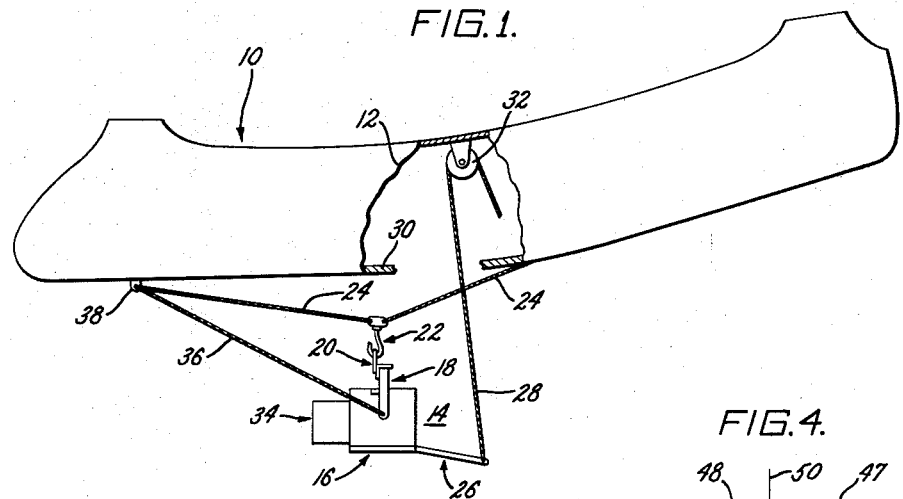
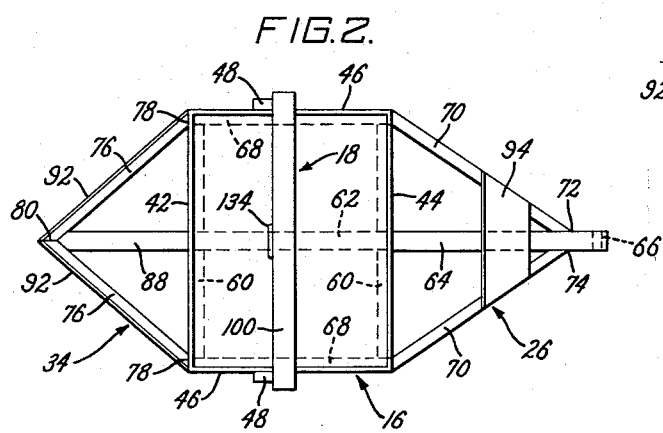
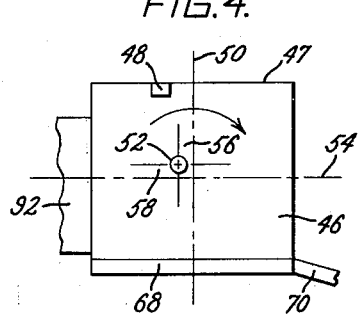
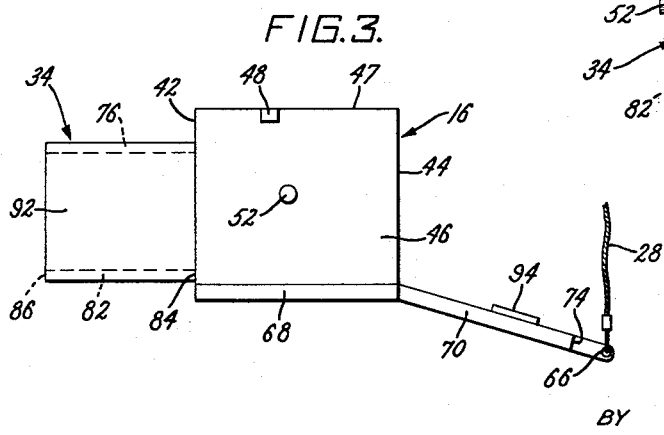
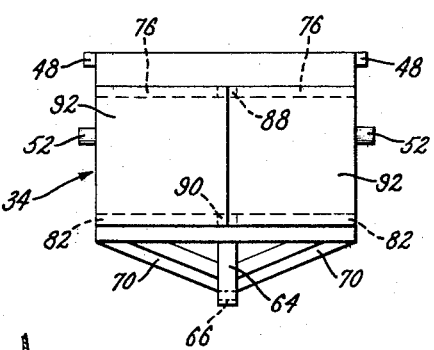
INVENTOR:
Corbitt T. Cannon,
Robert J. McDonnell
Franklin J. Vieth
BY
ATTORNEYS

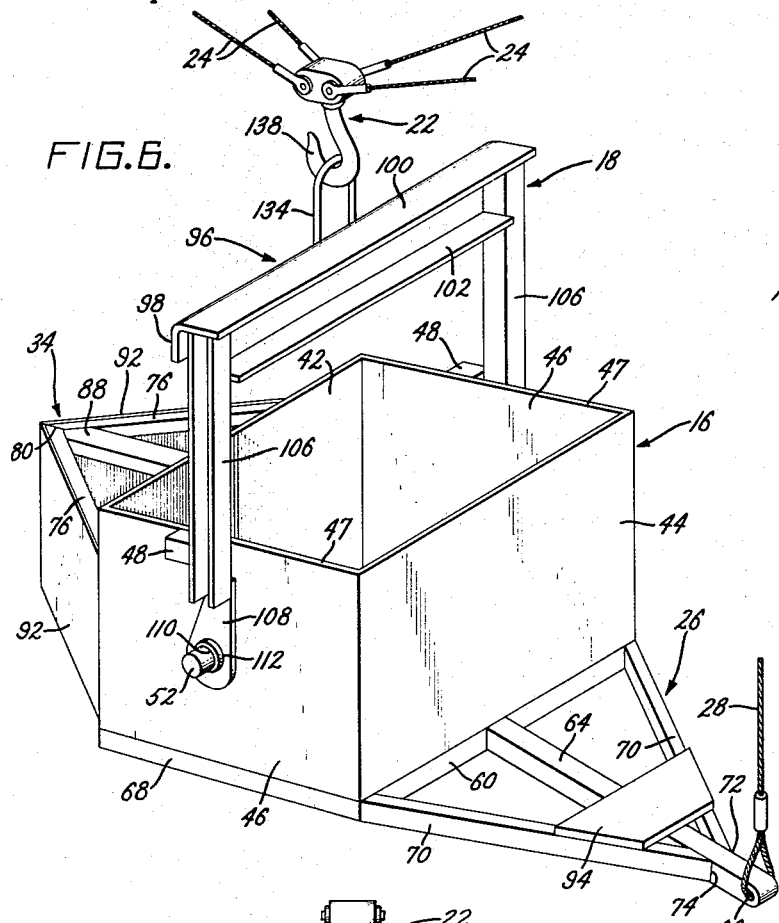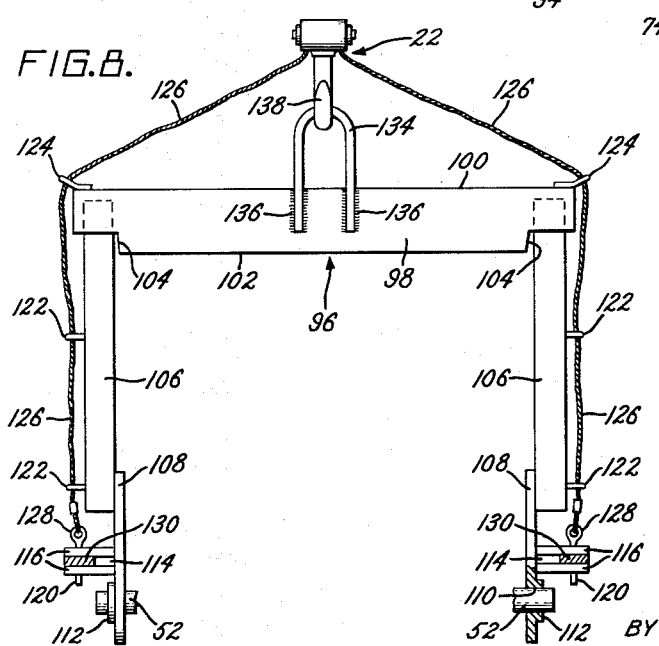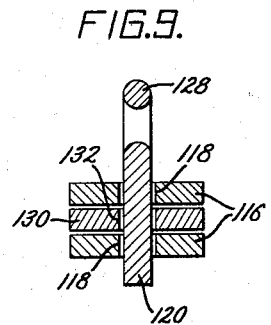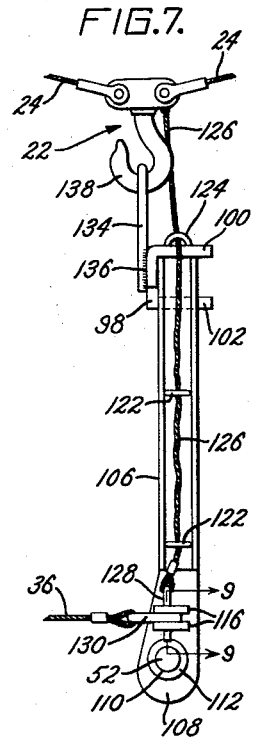

United States Patent Office 3,248,074
Patented Apr. 26, 1966

3,248,074
AIRBORNE CARRIER SYSTEM
Corbitt Thomas Cannon, Arnprior, Ontario, Canada, assignor to The Boeing Company, Seattle, Wash., a corporation of Delaware
Filed Apr. 28, 1964, Ser. No. 363,092
14 Claims. (Cl. 244—137)

This invention relates to self-righting receptacles and, more particularly, to a dumping self-righting receptacle that is airborne by powered aircraft of the hovering type, such as helicopters, for picking up loads of water and dumping such water in controlled and concentrated amounts on predetermined target areas, though not limited to such applications.

The problems created by forest fires in inaccessible areas are manifold, some of which have been lessened by the increasing use of aircraft. Aircraft of the normally fixed wing type have been used to drop men and fire fighting equipment and, to some extent, have been employed to drop various types of chemical fire fighting bombs and even water on fires. However, despite the many advances made in fire fighting techniques, the air methods presently in use in many respects are far from effective or efficient. An effective, efficient method of fighting fires from the air must also be developed to do the fighting alone or to complement the work of ground crews.

The logical method of air fire fighting is by bombing the fire with chemicals or water. Two major problems present themselves when bombing with fixed wing aircraft. One problem arises from the inherent incapability of a fixed wing aircraft to reduce its speed below 70 to 80 knots and to fly at altitudes under 100 feet and still remain in the air. Since the aircraft must travel at this relatively high rate of speed and high altitude, accurate bombing becomes relatively difficult and saturation bombing of a given point such as "hot-area" becomes virtually impossible. It has been calculated that 30% to 40% of the water, which is the most plentiful agent available, dropped at the aforementioned speed and altitude would be dispersed in the atmosphere before reaching the ground. The second major problem arises from the fact that the fixed wing aircraft must land and taxi in the water for relatively long distances to fill the container or must have a prepared runway in which to land, pick up the replenishment chemicals and take off again. If the containers are to be filled by taxiing on the lake or the like, filling is very low. And available runways or the like for picking up chemicals or ground filling of the tanks are usually great distances from the fire area. In addition, the hydrodynamic pressure fillable containers for use with fixed wing aircraft are, by necessity, extremely complicated to build and maintain.

A secondary problem arises from the fact that the fixed wing aircraft cannot be stationed in remote areas unless there is a sufficient body of water or a sufficiently cleared and leveled field for landing and taking off. This greatly hampers the effective positioning of the aerial fire fighting apparatus and greatly reduces the mobility of the fire fighters since they cannot be picked up readily once they are dropped. This characteristic causes the fixed winged aircraft to be unable to function as a completely satisfactory rescue vehicle.

The present invention is directed to a novel combination of a unique and novel self-righting receptacle in association with an aircraft such as a helicopter. The novel construction of the receptacle permits filling of the receptacle from any small body of water as long as it is large enough to contain the receptacle; most wooded areas abound with such bodies of water. Thus, with ready accessibility of water and repeated easy refilling while the aircraft is in constant flight, many trips between water source and fire can be made. More important with the novel receptacle-helicopter combination of the present invention, water can be accurately dropped on a fire at forward speeds from 80 knots all the way down to 0 knots so that the water drop can be effectively concentrated on a point such as the so-called "hot-area." Further, with the known characteristics of hovering aircraft, the water drop can be effected at 0 knots and at altitudes as low as 25 feet; experiments have shown that 95% of the contents of the receptacle actually effectively reach the fire.

The foregoing described unique and novel results are accomplished by a novel dumping self-righting receptacle rotatably mounted in a novel carrier system and mounted in a stabilized relation with a hovering aircraft so that the aircraft can make repeated trips between a minimal source of water or supply to the location of the fire or other drop with no adverse effect placed on the aircraft's flight characteristics. Further, the receptacle can be jettisoned if any emergency arises.

It is, therefore, a primary object of the present invention to provide a novel aircraft-borne, dumping, self-righting container means.

Another object of the present invention is to provide, in combination with a hovering aircraft, receptacle means suspended beneath said aircraft that can be quickly and efficiently filled and dumped with a minimum of adverse effect on the flight characteristics of the aircraft.

Still another object of the present invention is to provide a novel aircraft-borne receptacle means suspended beneath the aircraft and rotatably mounted in novel carrier means to permit efficient filling and dumping of the receptacle means.

Yet another object of the present invention is to provide a novel hovering aircraft-borne receptacle means, suspended beneath the aircraft, rotatably mounted in unique carrier means to permit efficient filling and dumping of said receptacle means, and further provided with novel stabilizing means to stabilize the receptacle with respect to the aircraft when said aircraft is in flight.

An additional object of the present invention is to provide a hovering type aircraft with a self-righting receptacle suspended beneath said aircraft and rotatably mounted to permit filling and dumping of the receptacle while the aircraft is in flight.

A further object of the present invention is to provide a hovering type aircraft with a novel self-righting and dumping receptacle suspended beneath the aircraft, rotatably mounted in novel carrier means to permit filling and dumping of the receptacle while the aircraft is in flight, novel means stabilizing the receptacle with respect to the aircraft, and novel lever means for dumping the receptacle and having means for aiding in returning the receptacle to an upright position.

Still an additional object of the present invention is to provide a hovering type aircraft with a self-righting and dumping receptacle suspended beneath the aircraft rotatably mounted in novel carrier means permitting easy filling and dumping of the receptacle while the aircraft is in flight, embodying novel stabilizing means for stabilizing the receptacle with respect to the aircraft, and having novel lever means for facilitating dumping of the receptacle, the lever means embodying means for aiding the return of the receptacle to an upright position and means for jettisoning the receptacle in the event of an emergency situation.

These and other objects of the present novel invention will become readily apparent from the following detailed description when read in connection with the attached drawings, wherein:

FIGURE 1 is a fragmentary elevational view of a hovering aircraft of the helicopter type, partially broken away, showing the novel dumping self-righting receptacle suspended therebeneath;

FIGURE 2 is a top plan view of the receptacle structure of the present novel invention;

FIGURE 3 is a side elevational view of the receptacle of the present invention with carrier assembly removed;

FIGURE 4 is a fragmentary side elevational view of the receptacle disclosed herein showing the relationship and mounting of the axle of the receptacle with respect to the center lines thereof;

FIGURE 5 is a front elevational view of the receptacle of the present invention with the carrier assembly removed;

FIGURE 6 is a perspective view of the receptacle and carrier assembly of the present novel invention showing further details of the lever arm and aerodynamic-shaped front portion;

FIGURE 7 is a side elevational view of the carrier assembly showing the details of the snubbing cable release mechanism;

FIGURE 8 is a front elevational view of the carrier assembly showing further details thereof;

FIGURE 9 is a sectional view taken substantially along the line 9—9 of FIGURE 7.

Referring to the drawings and particularly to FIGURE 1, the details of the present novel airborne dumping self-righting container will now be particularly described.

As heretofore stated, the present novel invention is directed to a novel dumping and self-righting receptacle assembly mounted in suspended relation to a hovering type of aircraft such as a helicopter and maintained in a stabilized condition suspended beneath said aircraft during flight, yet easily and efficiently operable for filling and dumping with an inherent ability for self-righting. Further, the receptacle is equipped with novel jettisoning means in the event of emergency situations.

As clearly seen in FIGURE 1, the numeral 10 generally designates a fragmentary elevational view of a hovering type aircraft or helicopter, broken away at the approximate midsection, as at 12, to disclose a portion of the interior of the aircraft. The novel bucket or container of the present invention is generally designated by the numeral 14 and generally comprises a bucket or container 16 rotatably mounted in a yoke or carrier 18. A bracket 20, which is secured to the carrier 18, is connected to a cargo sling hook 22 mounted on a cable 24, which is secured to the aircraft. The hook 22, in turn, is of the type that may be opened to release the load when the opening mechanism is actuated by the pilot. The lower right-hand end of the bucket 14, as viewed in FIGURE 1, is provided with a downwardly angulated lever arm assembly 26. The free end of the assembly 26 is attached to a pull cable 28, which extends upwardly and passes through an opening of a floor 30 and over a pulley or sheave 32 mounted within the aircraft. The forward end of the bucket or container 16 has an aerodynamic member or body 34 for imparting aerodynamic stability to the bucket and also to lessen drag on the aircraft. A pair of snubbing cables 36 is attached at opposite sides of the bucket to the yoke or carrier 18; the other ends of the cables 36 are connected to a common point or cleat 38 on the aircraft to further stablize the assembly while in flight.

The cargo sling 24 and hook 22 form no specific part of the invention in that the hook and sling arrangement is well-known. It is sufficient to state that cable 24 is actually comprises of four cables connected to four different portions of the aircraft. Two of the cables are shown in FIGURE 1. The hook contains a spring loaded cylinder that is releasable to allow a pivoted portion of the hook jaw to index past the spring loaded cylinder locking the pivoted portion of the jaw until a lanyard, which is connected to the spring loaded cylinder, is pulled to release the pivoted portion and cause the pivoted portion of the jaw to snap open and release the load being carried.

With the foregoing general description as a guide to the over-all structural features of the present invention, the details thereof will now be particularly described.

The container or bucket 16 is of generally rectangular shape or configuration having forward and rear portions or walls 42 and 44, respectively, and sides 46. The container or bucket may be formed from heavy sheet steel, aluminum, or any other suitable material. Mounted along upper edges 47 of the sides 46 is a pair of heavy-duty rectangular shaped stop blocks or abutment members 48, which are fixedly secured to the sides 46 as by welding, brazing, or other suitable means. As best seen in FIGURE 4, the stop members 48 are mounted forward of, or to the left of, vertical center line 50 of the bucket 16 for a purpose which will hereinafter become apparent. A pair of circular axles or trunnions 52, which extend outwardly from sides 46 a short distance, as seen in FIGURES 4, 5, and 6, is attached to the side walls 46 of the bucket. These may be replaced by axles extending through the side walls 46, so long as they function to rotatably support the bucket in the yoke 18. As shown in FIGURE 4, the numeral 54 indicates the horizontal center line of the bucket or container 16. The axles or trunnions 52 are offset to the left of the vertical center line 50 by a distance 56 and above the horizontal center line 54 by a distance 58, as clearly seen in FIGURE 4, to impart a self-righting turning moment, clockwise in FIGURE 4, to the bucket or container 16.

The lower end of the container or bucket 16 is reinforced by a frame structure. Along the lower edges of the forward and rear portions 42 and 44, respectively, are reinforcing strap members 60, which may be of any suitable configuration such as bar stock, angle iron, channel members, or the like. The strap members 60 are fixedly secured to the underside of the bucket 16 along the edges of the sides 42 and 44 by any suitable means such as welding, bolting, brazing or the like. An elongated reinforcing member 62 of any suitable configuration is fixedly secured midway between the sides 46 to the bottom of the container or bucket 16. As clearly seen in FIGURE 2, the bar or reinforcing member 62 extends the complete width of the bucket 16 and also extends beyond the rear wall or portion 44 to form an elongate lever portion 64, which has an aperture 66 in its extreme end. As seen in FIGURE 3, the lever arm portion 64 is angled downwardly with respect to the underside of the bucket 16 for a purpose which will hereinafter be explained.

The bottom edges of the sides 46 are also provided with reinforcing members 68, which are similar to straps 60 and are also jointed to the bucket or container 16. Thus, the straps 60 and the members 68 form a reinforcing frame structure for the underside of the bucket or container 16. The members 68 can be extended beyond the rear wall 44 to form integral angularly inwardly and downwardly bent lever support arms or portions 70, which are fixedly secured to opposite sides of the lever arm 64 at 72 and 74, just forward of the aperture 66 (FIGURES 2 and 3).

As heretofore mentioned, the forward or front end of the bucket 16 includes the aerodynamic member 34 to lessen drag and create stability while in flight. Mounted on the front or forward portion 42 of the bucket 16 short of the upper edge 47 of the bucket is a pair of upper support bars 76, which are fixedly secured adjacent the outer edges of the front portion 42, as indicated by the numeral 78, by suitable means. The two bars 76 are fixedly secured to each other at point or apex 80. A pair of lower support bars 82 is similarly mounted just short of the lowermost edge of the front portion and is similarly fixedly secured to the front portion 42 as indicated by numeral 84. The bars 82 are also joined to each other at point or apex 86.

Extending between the juncture of the bars 76 at apex 80 and the front portion 42 is a stabilizing or support member 88, which is fixedly secured at its ends by suitable means such as welding or the like to impart rigidity to the bars 76. Another stabilizing bar 90 is mounted between the apex 86 and the front part 42 to stabilize the lower support bars 82. Mounted over the upper and lower bars 76 and 82 and fixedly secured thereto by suitable means is an elongate sheet of suitable material 92 conforming to the triangular shape defined by the bars 76 and 82 and in effect defining an aerodynamic front to the bucket to add stability and lessen drag.

Referring momentarily to FIGURE 6, it is seen that a relatively large flat plate 94 is fixedly mounted by suitable means across the tops of the lever arms 70 and 64 and is of generally trapezoidal configuration. This flat plate aids in returning the bucket to an upright position after it has been immersed and filled.

Referring now to FIGURES 1, 6, 7, and 8, the details of the novel yoke or carrier 18 will now be particularly described. The carrier or yoke 18 comprises a relatively heavy-duty channel shaped member 96 which is formed of a web portion 98 and upper and lower wings or channels 100 and 102, respectively. The lower wing or channel 102 is cut away or shortened at both ends as indicated by the numeral 104 to accommodate vertical uprights 106. The upper ends of the vertical uprights 106 are attached by suitable means to the underside of the wing or channel 100, the adjacent face of the web 98, and the edges 104 of the lower wing or channel 102 to thereby fixedly locate the uprights 106 with respect to the channel 96.

The uprights 106, which are also formed of a suitably heavy-duty material such as channel iron, extend downwardly from the channel 96 toward the axles or trunnions 52, but terminate a short distance thereabove as clearly seen in the drawings. The lower ends of the uprights 106 removably mount by means of bolts or the like, relatively large flat bearing plates 108, which have axially aligned circular bores or apertures 110 for fixedly mounting, as by a press or shrink fit, outer races of bearing assemblies 112.

A pair of small flat plates 116 of suitable material is attached to the outer surface of the plates 108 and mounted in spaced relation to each other and above the bearing bores 110. Each plate has an axial bore or aperture 118 in axial alignment for receiving a slip pin 120. A series of circular cross sectioned U-shaped guide loops 122 is secured to the outer surfaces of uprights 106; guide loops 124 are disposed at each end of the channel 96 as clearly shown in FIGURES 7 and 8.

A snubbing release cable 126, which is connected to the cargo hook assembly 22, is threaded through the loops 122 and 124; the lower ends of the cable 126 are secured to loop eyes 128 of the slip pins 120. Mounted in the space 114 between the pair of plates 116 is a flat plate or connector 130 having a circular bore or aperture 132 in axial alignment with the apertures or bores 118. The pins 120 pass through the aligned apertures or bores 118 and 132 and maintain each of the plates 130 in each of the spaces 114 in assembled relationship with the plates 116. One end of each of the pair of snubbing cables 36 is connected to each of the plates 130; the opposite ends of the cables 36 are joined to the cleat or loop 38, which is rigidly mounted at the forward end of the helicopter 10 as hereinbefore described.

A heavy-duty steel circular cross sectioned U-shaped hanger 134 has its two free ends welded or otherwise suitably secured to the outer surface of the web 98 of the channel 96 as at 136. As clearly seen in FIGURES 6 and 8, the closed end of the hanger 134 extends substantially above the wing or channel 100 to define a hanger loop for reception or engagement with a hook 138 of the cargo hook assembly 22 for supporting the assembly beneath the helicopter.

As heretofore described, the axles or trunnions 52 are offset with respect to the center lines 50 and 54; by virtue of this offsetting, there is a turning moment, indicated by the clockwise arrow in FIGURE 4, about the axles 52 exerted by virtue of the weight of the receptacle and, of course, any contents of the receptacle. Rotation (clockwise in FIGURE 4) of the receptacle is limited by the stop members 48, which engage or abut adjacent sides or faces of the uprights 106, as best seen in FIGURES 1 and 6. Thus, the receptacle is maintained in an upright position with its open top facing upwardly.

In operation, the receptacle is picked up from the ground after the helicopter is airborne. The helicopter hovers above the receptacle and engages the cargo hook 138 with the hanger member 134. The helicopter then flies to a source of water and hovers thereover to align the receptacle with the water source. The helicopter then slowly drops in altitude and the bucket is tipped to a filling position by pulling upwardly on the pull cable or rope 28. The helicopter continues to lower until the bucket is immersed in water and fills; tension is maintained on the cable 28 until the bucket 16 is completely filled. The tension on the cable 28 is released once the bucket is filled. Because of the offset of the axles or trunnions 52, the weight of the receptacle 16 plus the contents thereof exert a substantial turning moment (clockwise in FIGURE 4) about the axles or trunnions 52 to return the receptacle to an upright position as indicated by the arrow.

The plate 94, which is mounted outwardly on the arms 64 and 70, is a further aid to returning the bucket to an upright position. As the bucket starts to return to its upright position, the water also exerts a downward hydraulic pressure on the plate 94 and this hydraulic force at the outward portion of the lever arm 64 exerts a further moment to return the bucket to the upright position. The rotation of the receptacle or bucket 16 is limited to an upright positioning of the bucket by virtue of the stops 48.

After the bucket is filled and returned to the upright position, the helicopter ascends to its proper flight altitude and proceeds to the fire source or other target area, the bucket being fully stabilized in flight by virtue of the aforementioned turning moment maintaining the bucket in an upright position and also by the snubbing cables 36 and the airfoil body 34. Once over the fire source or target area, the helicopter again descends to a desired altitude and positions itself properly over the "hot-area" of the fire or the desired target drop area and then maintains this attitude of flight by virtue of the well-known inherent flight capabilities of the helicopter.

When properly positioned over the target area, the pull cable 28 is again pulled upwardly to transmit an upward force on the lever arm 64, and the receptacle 16 is rotated (counterclockwise direction in FIGURE 4) about the axles 52 and the water or other content of the receptacle 16 is poured over the front edge or side 42.

It has been found for purposes of fire fighting that a rectangular receptacle is most desirable since the water pours over the entire front side 42 in a sheet rather than "funneling" as would be the case with a triangular or cylindrical receptacle, the sheet of water being more effective rather than the concentrated spout from a cylindrical type container. However, it is clearly pointed out that this invention in no way is restricted to the shape of the container to be employed.

From the foregoing, it will be readily appreciated that the unique combination permits many trips to be made from water source to target area without the necessity of landings and takeoffs and that the drops can be effectively controlled by precise control of the altitude and forward speeds of the aircraft to effectively place the contents of the receptacle precisely on target.

In the event of an emergency, the receptacle-carrier assembly can easily and quickly be jettisoned from the aircraft with a minimum of difficulty. If an emergency situation arises, the cargo hook 138 is opened by suitable controls to thereby disengage from the hanger 134. As a result of this disengagement, the receptacle or bucket 16 will commence to fall. As the bucket 16 commences to fall free from the cargo hook 138, a tension is placed on the snubbing release cables 126, which are secured to the cargo hook assembly 22. By virtue of the tension placed on the snubbing release cables 126, the pins 120 are withdrawn from the aligned openings 118 and 132 in the plates 116 and 130, respectively. As the pins pull free from the openings, the plates 130 are disengaged from connected relation to the plates 116 and freely slide from the spaces 114. Thus, it is readily seen that by simply releasing the cargo hook 138 the snubbing cables 36 are automatically released and the receptacle-carrier assembly is free to fall clear of the aircraft.

The invention has been described with reference to its use in fire fighting since this is a unique function of this novel combination. However, the uses to which this invention can be put are myriad. For example, this type of invention can be used to transfer liquid contents from one large open topped tank to another, or to water special areas, or to chemically treat certain areas or the like.

In addition, this invention has been specifically described for use in conjuction with a helicopter although it is clear that it may have uses with aircraft other than helicopters.

I claim:

1. In combination with a VTOL aircraft having an exterior cargo sling and hook, a tiltable receptacle having a carrier means supporting said receptacle, said carrier means being suspended from said cargo hook, control means attached to said receptacle and capable of controlling the tilting action of said receptacle.

2. The cargo hook as set forth in claim 1 having a releasing mechanism which enables it to release its load.

3. In combination with a helicopter, an airborne self-righting receptacle comprising a support carrier; a receptacle; mounting means on said receptacle rotatably mounted on said carrier, whereby said receptacle may rotate with respect to said carrier; said mounting means being attached to said receptacle at predetermined locations whereby the weight of said receptacle exerts a turning moment about said mounting means; said receptacle and said carrier having cooperating means to limit rotation of said receptacle due to said turning moment to maintain said receptacle in an upright position with respect to said carrier; lever means secured to a lower end of said receptacle and extending angularly downward therefrom; support means connected to said carrier; engaging means on said helicopter engaging said support means to support said receptacle beneath said helicopter; and turning means connected to a free end of said lever means and extending upwardly therefrom into said helicopter whereby an upward force applied to said turning means is transmitted to said lever means to impart a dumping rotation to said receptacle counter to said turning moment.

4. In combination with a helicopter, an airborne self-righting receptacle comprising a support carrier; a receptacle; mounting means on said receptacle rotatably mounted on said carrier, whereby said receptacle may rotate with respect to said carrier; said mounting means being attached to said receptacle at predetermined locations whereby the weight of said receptacle exerts a turning moment about said mounting means; said receptacle and said carrier having cooperating means to limit rotation of said receptacle due to said turning moment to maintain said receptacle in an upright position with respect to said carrier; lever means secured to a lower end of said receptacle and extending angularly downward therefrom; support means connected to said carrier; engaging means on said helicopter engaging said support means to support said receptacle beneath said helicopter; turning means connected to a free end of said lever means and extending upwardly therefrom into said helicopter whereby an upward force applied to said turning means is transmitted to said lever means to impart a dumping rotation to said receptacle counter to said turning moment; and stabilizing means fixedly secured at one end to said helicopter and removably secured at an opposite end to said carrier to maintain said carrier and said receptacle in a stabilized relationship with respect to said helicopter.

5. In combination with a helicopter, an airborne self-righting receptacle comprising a support carrier, a receptacle; mounting means on said receptacle rotatably mounted on said carrier, whereby said receptacle may rotate with respect to said carrier; said mounting means being attached to said receptacle at predetermined locations, whereby the weight of said receptacle exerts a turning moment about said mounting means; said receptacle and said carrier having cooperating means to limit rotation of said receptacle due to said turning moment to maintain said receptacle in an upright position with respect to said carrier; lever means secured to a lower end of said receptacle and extending angularly downward therefrom; support means connected to said carrier; engaging means on said helicopter engaging said support means to support said receptacle beneath said helicopter; turning means connected to a free end of said lever means and extending upwardly therefrom into said helicopter, whereby an upward force applied to said turning means is transmitted to said lever means to impart a dumping rotation to said receptacle counter to said turning moment; stabilizing means fixedly secured at one end to said helicopter and removably secured at an opposite end to said carrier to maintain said carrier and said receptacle in a stabilized relationship with respect to said helicopter; and an airfoil body mounted at a forward end of said receptacle to lessen drag created by said receptacle when said helicopter is in flight.

6. In combination with a helicopter, an airborne self-righting receptacle comprising a support carrier; a receptacle having an open top; mounting means on said receptacle rotatably mounted on said carrier, whereby said receptacle may rotate with respect to said carrier; said mounting means being attached to said receptacle at predetermined locations, whereby the weight of said receptacle exerts a turning moment about said mounting means; said receptacle and said carrier having cooperating means to limit rotation of said receptacle due to said turning moment to maintain said receptacle in an upright position with said open top upwardly with respect to said carrier; elongate lever means secured to a lower end of said receptacle and extending angularly downward therefrom; support means connected to said carrier; support cables mounted on said helicopter and mounting engaging means thereon; said engaging means being connected to said support means to support said receptacle beneath said helicopter; turning means connected to a free end of said lever means and extending upwardly therefrom into said helicopter, whereby an upward force applied to said turning means is transmitted to said lever means to impart a dumping rotation to said receptacle means counter to said turning moment; stabilizing means fixedly secured at one end to said helicopter and removably secured at an opposite end to said carrier to maintain said carrier and receptacle in a stabilized relationship with respect to said helicopter; and airfoil body mounted at a forward end of said receptacle to lessen drag created by said receptacle when said helicopter is in flight; and release means connected to said engaging means and removably connected to the removably secured ends of said stabilizing means.

7. In combination with a helicopter, an airborne self-righting receptacle comprising a substantially U-shaped carrier having a downwardly disposed open end; a receptacle; mounting means on opposite sides of said receptacle in axial alignment, rotatably mounted in said carrier, whereby said receptacle may rotate with respect to said carrier; said mounting means being secured to the opposite sides of said receptacle in a predetermined offset relationship with respect to the vertical and horizontal center lines of said receptacle, whereby the weight of said receptacle exerts a turning moment about said mounting means; stops mounted on opposite sides of said receptacle in axial alignment and in abutting relationship with said carrier in one position of said receptacle to maintain said receptacle in an upright position with respect to said carrier; an elongate lever extending downwardly and outwardly from a lower end of a side of said receptacle; a support mounted on said carrier and extending upwardly therefrom; support cables secured to said helicopter and extending therebeneath; engaging means of said support cables in connected engagement with said support to support said receptacle beneath said helicopter; turning means connected to said lever and extending upwardly therefrom into said helicopter, whereby an upward force is applied to said turning means is transmitted to said lever to impart rotation to said receptacle counter to said turning moment; and an airfoil body mounted at a front portion of said receptacle to lessen drag created by said receptacle when said helicopter is in flight.

8. In combination with a helicopter, an airborne self-righting receptacle comprising a substantially U-shaped carrier having a pair of spaced downwardly disposed uprights, a receptacle disposed between said uprights; axles on opposite sides of said receptacle rotatably mounted in bearing plates; means securing said bearing plates to the lower ends of said uprights; said axles being attached to the opposite sides of said receptacle and offset to one side of the vertical center line of said receptacle and also offset above the horizontal center line of said receptacle whereby the weight of said receptacle exerts a turning moment about said axles; lever means secured to a lower end of said receptacle and extending angularly downward therefrom; a hanger secured to an uppermost portion of said carrier and extending thereabove; a cargo hook suspended beneath said helicopter and adapted to engage said hanger to suspend said receptacle therebeneath; and a cable connected to a free end of said lever means and extending upwardly into said helicopter whereby an upward force on said cable exerts a turning moment on said receptacle of the opposite magnitude of that created by the weight of said receptacle to move said receptacle to dumping position.

9. In combination with a helicopter, an airborne self-righting receptacle assembly comprising a substantially U-shaped carrier defined by a horizontal member and a pair of spaced downwardly depending uprights; an open topped receptacle disposed between said uprights; axles on opposite sides of said receptacle rotatably mounted in bearing plates; means securing said bearing plates to the lower ends of said uprights; said axles being secured to the opposite sides of said receptacle and offset to one side of the vertical center line of said receptacle and also offset above the horizontal center line of said receptacle whereby the weight of said receptacle exerts a turning moment about said axles; an elongate lever secured to a lower end of said receptacle and extending angularly downward therefrom; a hanger secured to the horizontal member of said carrier and extending substantially thereabove; a cargo hook attached to said helicopter and suspended therebeneath; said cargo hook being adapted to engage said hanger to support said receptacle beneath said helicopter; a cable connected to a free end of said lever and extending upwardly therefrom into said helicopter, whereby an upward force on said cable transmits a turning moment through said lever to said receptacle opposite to that created by the weight of said receptacle; and stabilizing ropes removably attached at one end to the uprights of said carrier and at their other ends to a common point on said helicopter to stabilize said receptacle when said helicopter is in flight.

10. The device as set forth in claim 9 wherein each of said uprights is provided with a pair of spaced plates having axially aligned bores; a connector plate having an aperture therethrough attached to said one ends of said stabilizing ropes; each of said connector plates being mounted between said spaced plates with said bores and said apertures in axial alignment; and a slip pin mounted through the bores of said plates and the aperture of said connector to maintain each of said connector plates between said plates, and each of said connector plates being removable therefrom upon removal of each of said slip pins.

11. The device as set forth in claim 10 wherein a release cable is attached at a midpoint to said cargo hook and its opposite ends are fixedly attached to said slip pins, whereby tension on said release cable causes said slip pins to be removed from said bores and said apertures to permit said connector plates to become disengaged from said plates.

12. The device as set forth in claim 11 wherein said release cable is guided along the horizontal member of said carrier and downwardly along said uprights to said slip pins by a plurality of loop members fixedly secured to the horizontal member and uprights of said carrier.

13. The device as set forth in claim 9 wherein a triangularly-shaped body is attached to the forward end of said receptacle with the apex thereof extending forwardly of said receptacle to define an essentially airfoil-shaped body to impart aerodynamical stability to said receptacle and lessen the drag effects of said receptacle.

14. The device as set forth in claim 9 wherein a relatively large flat sheet member is attached to said elongate lever outwardly of said receptacle to serve when downward force is applied thereto to further effect a turning moment on said receptacle in the same direction as that created by the weight of said receptacle.

References Cited by the Examiner

UNITED STATES PATENTS

| 1,396,894 | 11/1921 | Stevens | 244—136 |
| 3,065,934 | 11/1962 | Jackson | 244—137 |
| 3,081,121 | 3/1963 | Campbell | 244—137 |

FOREIGN PATENTS

| 470,442 | 1/1951 | Canada. |
| 54,300 | 2/1938 | Denmark. |

OTHER REFERENCES

Aviation Week, July 11, 1960, page 98.

MILTON BUCHLER, *Primary Examiner.*

ALFRED E. CORRIGAN, *Examiner.*